Aug. 2, 1927.
C. L. GARY
1,637,563
BINOCULAR MICROSCOPE
Filed Aug. 17, 1925
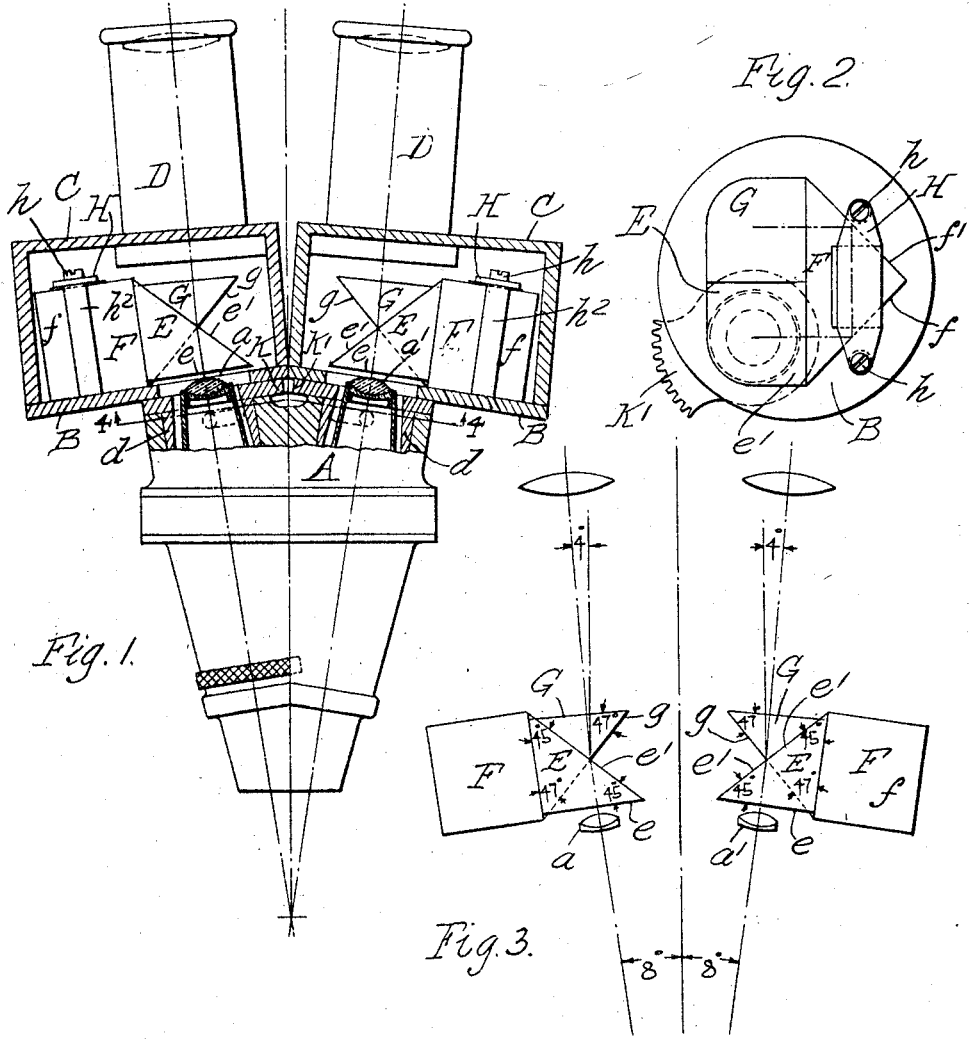
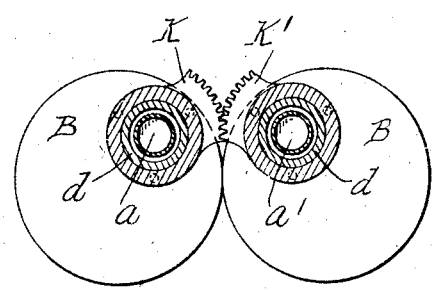
INVENTOR.
Charles L. Gary
By
Parker & Brochnow
ATTORNEYS Patented Aug. 2, 1927.

1,637,563

UNITED STATES PATENT OFFICE.

CHARLES L. GARY, OF KENMORE, NEW YORK, ASSIGNOR TO SPENCER LENS COMPANY, OF BUFFALO, NEW YORK.

BINOCULAR MICROSCOPE.

Application filed August 17, 1925. Serial No. 50,639.

This invention relates to binocular microscopes of the kind having the optical axes of the objectives arranged at different angles from the optical axes of the eyepieces.

The objects of this invention are to provide a microscope of this kind with a system of prisms which serve the twofold purpose of erecting the image and of deflecting the light from the objectives at an angle to the optical axes thereof, which prisms are of comparatively simple construction and easier to manufacture than prisms of this kind heretofore used; also to provide a binocular microscope in which the parts are so arranged relatively to each other that the eyes of the user of the microscope are adjusted for normal, close up work to relieve eye strain in the use of the microscope; also to provide a microscope of this kind with means of improved construction for obtaining the desired adjustment for different pupillary distances; also to improve the construction of binocular microscopes in other respects hereinafter specified.

In the accompanying drawings,

Fig. 1 is an elevation, partly in section, of a binocular microscope embodying the invention.

Fig. 2 is a top plan view of a set of prisms with the cover of the prism housing removed.

Fig. 3 is a diagrammatic view showing the relative arrangement of the objective and eyepiece lenses and the prisms.

Fig. 4 is a sectional bottom plan view thereof on line 4—4, Fig. 1.

A represents, in general, the housing or body portion of the miscroscope in which the objectives are mounted and $a$, $a'$ represent the objective lenses. The prism or reflector housings are preferably mounted on the upper ends of the main housing A of the microscope. Each of these prism housings, in the particular construction illustrated, includes a base B and a cap or cover portion C mounted on the base B, and eyepiece tubes D are secured to the cover portions of the prism housings. The prism housings may be of usual construction and are preferably cylindrical in form and are provided with downwardly extending tubular portions $d$ which are journalled to turn in the upper ends of the housing or body portion A of the microscope. The eyepiece tubes are arranged eccentrically with reference to the axes of rotation of the prism housings and consequently these housings may be turned to adjust the eyepiece tubes D for different pupillary distances. All of these parts so far described have heretofore been used in connection with binocular microscopes and of themselves constitute no part of this invention.

In order to obtain a stereoscopic view of the subject which is being examined, the objective lenses are preferably arranged to converge so that the angle between the optical axes of the two objectives is about 16°. It has been found, however, that this angle, while producing a good stereoscopic effect also produces eye strain on the user of the microscope if the eyepieces also converge at this angle, for the reason that in normal vision the human eyes are not used in such a manner that the optical axes of the two eyes are arranged at an angle of 16° to each other, an angle of about 8° being more nearly the angle of the eyes in reading or other close up use, and when viewing articles at a distance, the eyes operate with their axes practically parallel. I have found, however, that if, in a microscope, the path of light from the objectives is changed in such a manner that the eyepieces of the microscope are arranged parallel to each other, the average user of microscopes experiences eye strain for the following reason. If the eyepiece tubes are parallel, the eyes are converged for distant vision, and should therefore be focused for distant vision to maintain a normal balance of muscles. This can be done by proper manipulation of a microscope having parallel eyepiece tubes. However, the average user of the microscope is continually looking into the microscope and then at notebook or the like on the table. This necessitates a constant change of eye accommodation with its attendant fatigue. If the microscope is so designed that focus and convergence of the eyes is the same when using the microscope as in the other work attendant on its use, a saving of eye strain results. In accordance with my invention the light from the objectives is deflected in such a manner that the optical axes of the two eye pieces are arranged at an angle of about 8° from each other while the optical axes of the objectives are arranged at an angle of about 16° from each other. By this arrangement of the optical axes of the eyepieces, the eyes are used in the same manner as in reading or writing or other close up work, both as to the angular adjustment of the eyes relatively to each other and as to the focusing of the eyes, and consequently no eye strain results in looking alternately through the microscope and then at a book or the like.

The changing of the angle of the light passing from the objectives to the eye piece tubes D and the erecting of the image may be accomplished by any suitable means. In the particular construction shown, a series of reflecting surfaces is employed, three prisms E, F, and G being used for this purpose in connection with each unit or tube of the microscope, and the prisms are arranged within the prism housings. The prism E, Figs. 1 and 3, is provided with a face $e$ arranged substantially perpendicular to the optical axis of the objective lens and through which the light from the objective lens passes. In the particular construction shown the prism E is provided with a face $e'$ which deflects the rays of light into the prism F. This prism, as is clearly shown in Fig. 2, has two reflecting faces $f$ and $f'$ which are so arranged that the rays reflected from the face $e'$ of the prism E are reflected by the face $f$ of the prism F to the face $f'$, from which they are again reflected in a direction substantially parallel with the direction of the rays entering the prism F. The rays from the reflecting surface $f'$ pass to the third prism G and strike an inclined face $g$ thereof from which they are projected upwardly out of the prism G and into the eye piece tube D. By means of this arrangement of the prisms the image is erected, and a change in the angle of the rays can be effected by providing either or both of the prisms E and G with angles other than 45° between the faces $e'$ and $g$ of these prisms and the adjacent sides thereof, or by changing the angularity of either or both of the faces $f$ or $f'$ of the prism F with reference to the triangular faces of this prism so as to produce the desired angle in the rays of light leaving the final reflecting surface $g$. In the particular construction shown, the prism E is a 45° prism and the prism G is a 47° prism as clearly indicated in Fig. 3 and this arrangement of the angles results in the reflection of the rays of light from the prism G in a direction at an angle of 4° from the optical axis of the objective. It will be obvious, however, that the prism E may be a 47° prism, G would then be a 45° prism or the prisms E and G may each be 46° prisms, or the prisms E and G may both be 45° prisms and one or both of the two reflecting faces $f$ or $f'$ of the prism F may be arranged at angles other than 90° to the triangular faces of this prism. In case other angles than 8° between the eye pieces are desired the angles of the reflecting faces of the prism E, F or G may be changed to produce the angle desired between the eyepiece tubes.

By means of this arrangement of the prisms, any two of the prisms, for example, the prisms E and F in the construction shown may be simple right angle prisms with 45° angles between their oblique faces and their sides, and the prism G is also a prism which can readily be manufactured, and none of these prisms require the expert hand work which is necessary to produce a "roof" type of prism. The construction and arrangement of the prisms also has the advantage that they can be mounted in housings which are rotatable to permit of the necessary adjustment for different pupillary distances.

The prisms may be held in place in their housings in any suitable or desired manner. In the particular construction shown the prism F is clamped to the base B of the prism housing by means of a transverse clamping bar H and a pair of screws or bolts $h$ which engage standards or posts $h^2$ secured to the base B. The other prisms E and G may be cemented or otherwise secured to the prism F. It will also be noted that by the use of these prisms, an adjustment of the prism housings about the axes of the objectives can be utilized to secure the desired pupillary distance between the eyepiece tubes. This can be effected by means of the following construction.

Gear segments K and K' are secured to the reflector housings B or to the bearing portions $d$ thereof and these gear segments mesh so that the turning of one of the housings B produces a corresponding turning of the other housing in the opposite direction. Consequently when these housings are positioned into correct optical relation to each other, the gear segments will serve to maintain each eyepiece tube in the same relation to the objective as the other eyepiece tube. Prisms of the general type described lend themselves particularly well to this form of adjustment, which is simple and inexpensive to manufacture and very easy for the user of the microscope to manipulate.

I claim as my invention:—

1. A binocular microscope including a pair of converging objectives arranged with their optical axes at an angle to each other to produce stereoscopic effect, eyepieces converging at a smaller angle than said objectives, and reflecting means interposed between said objectives and said eyepieces for reflecting light from said objectives to said eyepieces and for erecting the image.

2. A binocular microscope including a pair of objectives arranged with their optical axes converging at an angle of approximately 16 degrees, eyepieces arranged with their optical axes converging at approximately half the angle of said objectives, and reflecting means interposed between said objectives and said eyepieces for reflecting light from the objectives to the eyepieces and erecting the image.

3. A binocular microscope including a pair of converging objectives arranged with their optical axes at an angle to each other to produce stereoscopic effect, eyepieces converging at a smaller angle than said objectives, reflecting means interposed between said objectives and said eyepieces for reflecting light from said objectives to said eyepieces and for erecting the image, and housings in which said reflecting means are arranged and on which said eyepieces are mounted, said housings being adjustable relatively to said objectives to move said eyepiece tubes to different pupillary distances.

4. A binocular microscope including a pair of converging objective lenses arranged with their optical axes at an angle to each other to produce stereoscopic effect, converging eyepiece tubes, each of which is arranged at an angle to the optical axis of its objective lens, and prismatic reflecting means arranged between said objectives and eyepieces and each including a reflecting surface for reflecting light from the objective in a direction substantially at right angles to the optical axis of the objective, and other reflecting surfaces which reflect the light to the eyepiece in a direction substantially at right angles thereto and then into the eyepiece, said reflecting surfaces changing the direction of light in such a manner that the light passes into the eyepiece at an angle to the direction in which the light passes through the objective.

5. A binocular microscope including a pair of converging objective lenses arranged with their optical axes at an angle to each other to produce stereoscopic effect, eyepiece tubes, each of which is arranged at an angle to the optical axis of its objective lens, prismatic reflecting means arranged between said objectives and eyepieces and adapted to reflect light from said objectives to said eyepieces, housings in which said reflecting means are mounted and which are rotatable about the optical axes of said objectives, and connections between said housings for transmitting movement of one housing to the other housing.

6. A binocular microscope including a pair of converging objective lenses arranged with their optical axes at an angle to each other to produce stereoscopic effect, eyepiece tubes, each of which is arranged at an angle to the optical axis of its objective lens, prismatic reflecting means arranged between said objectives and eyepieces and adapted to reflect light from said objectives to said eyepieces, housings in which said reflecting means are mounted and which are adjustable about the optical axes of said objectives, and gear segments secured on said housings and meshing with each other, whereby the movement of one housing produces corresponding movement in the opposite direction of the other housing.

7. A binocular microscope including a pair of converging objective lenses arranged with their optical axes at an angle to each other to produce stereoscopic effect, eyepiece tubes, each of which is arranged at an angle to the optical axis of its objective lens, and prismatic reflecting means arranged between said objectives and eyepieces and each including a reflecting surface for reflecting light from the objective in a direction transverse to the optical axis of the objective, a final reflecting surface adapted to reflect light from a transverse direction into the eyepiece tube, and means for reflecting light from said first reflecting surface to said final reflecting surface, the angles of said reflecting surfaces being such that the light passes into the eyepiece tube at an angle of lesser convergence than that of the optical axis of the objective lens.

8. A binocular microscope including a pair of converging objective lenses arranged with their optical axes at an angle to each other to produce stereoscopic effect, eyepiece tubes, each of which is arranged at an angle to the optical axis of its objective lens, and prismatic reflecting means arranged between said objectives and eyepieces and each including a reflecting surface for reflecting light from the objective in a direction transverse to the optical axis of the objective, a final reflecting surface adapted to reflect light from a transverse direction into the eyepiece tube, and a pair of reflecting surfaces one of which receives light from the first reflecting surface and reflects the same to the other reflecting surface of said pair, the light being reflected from the other reflecting surface of said pair to said final reflecting surface, the reflecting surfaces being arranged at such angles as to cause light to pass into the eyepiece tube at an angle to the optical axis of the objective.

9. A binocular microscope including a pair of converging objective lenses arranged with their optical axes at an angle to each other to produce stereoscopic effect, eyepiece tubes, each of which is arranged at an angle to the optical axis of its objective lens, and prismatic reflecting means arranged between said objectives and eyepieces and each including a prism arranged to receive light from said objective and reflect the same laterally of the optical axis of the objective, a second prism having a pair of reflecting surfaces arranged to reflect light from said first prism, and a third prism adapted to receive light from said second prism and formed with all of its optical faces arranged at acute angles to each other to reflect the light upwardly into the eyepiece at an angle to the optical axis of the objective.

10. A binocular microscope including a pair of converging objective lenses arranged with their optical axes at an angle to each other to produce stereoscopic effect, eyepiece tubes, each of which is arranged at an angle to the optical axis of its objective lens, and prismatic reflecting means arranged between said objectives and eyepieces and each including a prism arranged to receive light from said objective and having an inclined face adapted to reflect light laterally with reference to the optical axis of said objective, a second prism to which said first prism is secured and having a pair of substantially upright reflecting surfaces arranged at an angle to each other, and a third prism mounted on said second prism and having a face arranged at an inclination to the optical axis of the eyepiece tube and adapted to receive light from said second prism, the reflecting faces of said prisms being arranged at such angles as to cause light to pass into the eyepiece tube at an angle to the optical axis of the objective lens.

11. A binocular microscope including a pair of converging objective lenses arranged with their optical axes at an angle to each other to produce stereoscopic effect, eyepiece tubes, each of which is arranged at an angle to the optical axis of its objective lens, and prismatic reflecting means arranged between said objectives and eyepieces and each including a prism arranged to receive light from said objective and having a face arranged at an angle of 45° to the optical axis of the objective to reflect light laterally with reference to said optical axis, a second prism having a reflecting surface arranged in a substantially upright plane and at an angle of approximately 45° to the direction of light from said first prism, and a second reflecting face arranged substantially at right angles to the first reflecting face of said second prism and receiving light from the first face of said second prism, and a third prism having a reflecting face adapted to receive light from the second reflecting face of the second prism and arranged at an angle other than 45° to the direction of light passing to said reflecting face of said third prism and adapted to reflect light into said eyepiece tube at an angle to the optical axis of the objective.

12. In a binocular microscope the combination of a pair of objectives each converging to a point on the focal plane of each objective, a prism housing rotatably mounted to turn about the optical axis of each objective, eyepiece tubes eccentrically mounted on said prism housing, a series of prisms in each of said prism housings for reflecting the light from an objective to an eyepiece, whereby the rotation of said prism housings serves to adjust said eyepiece tubes for pupillary distance, and gearing connecting said prism housing to cause the rotation of either prism housing to produce a corresponding rotation of the other prism housing.

CHARLES L. GARY.